A. A. DENNIS.
PNEUMATIC TIRE.
APPLICATION FILED FEB. 24, 1912.

1,043,407.

Patented Nov. 5, 1912.

UNITED STATES PATENT OFFICE.

ALFRED A. DENNIS, OF GRAND RAPIDS, MICHIGAN.

PNEUMATIC TIRE.

1,043,407. Specification of Letters Patent. Patented Nov. 5, 1912.

Application filed February 24, 1912. Serial No. 679,551.

*To all whom it may concern:*

Be it known that I, ALFRED A. DENNIS, of Grand Rapids, in the county of Kent, and in the State of Michigan, have invented a certain new and useful Improvement in Pneumatic Tires, and do hereby declare that the following is a full, clear, and exact description thereof.

The object of my invention is to produce a pneumatic tire, which, without any impairment whatever of the elasticity or resiliency which the air affords, and which so well fits the pneumatic tire for automobiles, will possess in more perfect degree than has heretofore been attained, freedom from liability to punctures and blow-outs, durability, and freedom from liability to skid, and possess in addition to these advantages others of perhaps less importance, but nevertheless of consequence.

Figure 3:
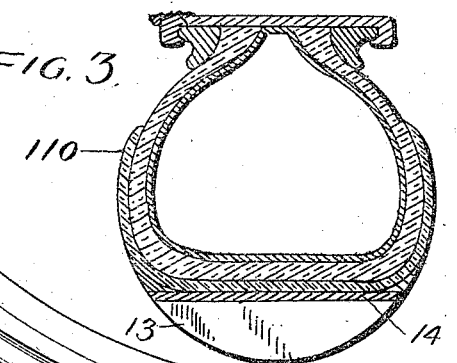
Figure 1:
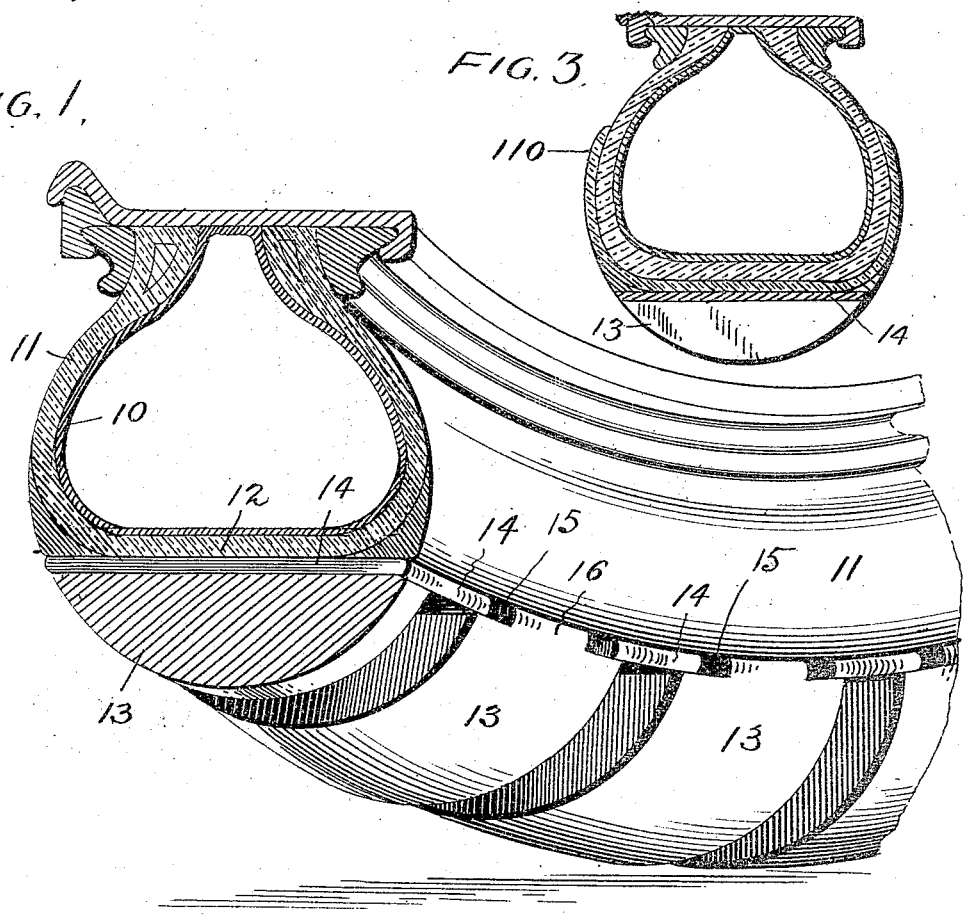
Figure 2:
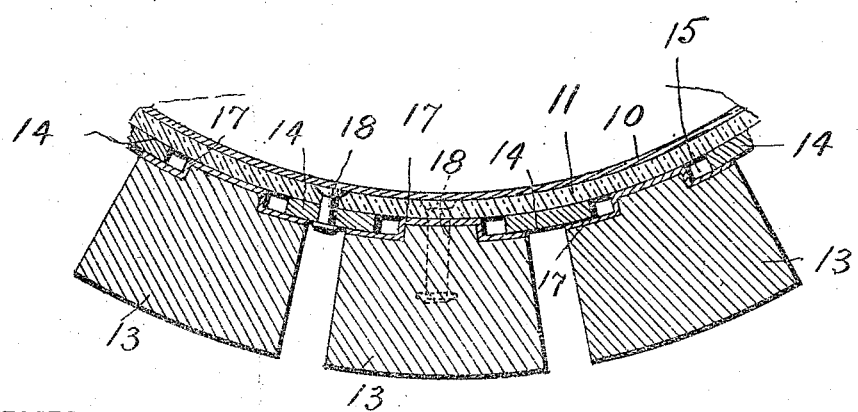

In the drawings—Figure 1 is a perspective view of a portion of a pneumatic tire embodying one form of my invention; Fig. 2 is a longitudinal section thereof; and Fig. 3 is a cross section showing a form of my invention adapted for application to pneumatic tires of ordinary form.

Briefly described, my invention comprehends as its salient feature, the provision of a tread or a bearing member in the form of a circumferential series of spaced blocks of suitable material (whether elastic or inelastic is immaterial) which are individually attached to the outer circumferential elastic wall of the outer tube or casing, so as to be capable of movement relative to each other when engaging and passing an obstacle, in a direction circumferential of the tire as well as inward, so that the flexibility required to utilize the air cushion in the tire, is afforded, these blocks being of such thickness, radially of the wheel, as to remove the wall of the outer tube that is nearest the roadway in passing thereover sufficiently far from the latter as to be beyond the penetrating reach of such puncturing objects as are ordinarily encountered, and which might coincide with the gaps or spaces between the blocks and said thickness being such that the formation of the outer wall of the outer tube is that of a chord, or chordlike.

The tire shown in the drawings to illustrate an embodiment of my invention, comprises, as is usual, an inner tube 10 and an outer tube or casing 11, but the outer wall 12 of the latter in cross section is a chord or chordlike, and attached thereto are the circumferential series of tread-forming, or bearing blocks 13, each having an inner chordlike face that fits the similar formation of the outer casing, and a convex outer face corresponding to the curvature and of the same radius as the arc of curvature of the exterior of the outer casing so that the general external shape and appearance is similar to that of an ordinary pneumatic tire; but, of course, the precise external configuration, or shape of the blocks 13 is immaterial and the form thereof may be varied as may be found desirable or convenient. The blocks may be made solid, or cellular, and of rubber, fiber, or any available material which will enable them to perform their intended function of constituting the flexible bearing member of the tire, which while amply protecting the same from punctures and blow outs, will efficiently utilize the air cushion.

The ends of adjacent blocks 13, especially when the tire is inflated, and the tube stretched, are separated by spaces or gaps, and to provide a cover and protection at the otherwise exposed outer surface of the outer tube, there are filling pieces 14 in the form of transversely applied strips of tough rubber, or rubber fabric, or other proper material, and the contiguous edges of the blocks are undercut, or recesses 15 are otherwise provided, so that the hereinbefore mentioned independent circumferential movement of the blocks 13 may take place.

Both the blocks 13 and the strips 14, may be vulcanized or riveted to the outer casing, or the union between them and the tube effected in any desired way; and the blocks 13 may be integral with or separate from the narrower part 16 thereof that lies next the outer tube and between opposite filling strips.

Where the blocks 13 are of a material apt to be cut or worn by the presence of particles of sand, etc. between their surfaces and the surfaces of the filling strips, the wear-resisting plate 17, of sheet metal, shown in Fig. 2, may be employed and the filling strips made of metal. In Fig. 2 the filling strips and the blocks are shown as attached to the outer casing by rivets 18.

It will be evident, that the separation of the blocks, and the presence of the corners at their ends, renders the tire nonskidding when the blocks engage the roadway; and experience has shown that a much lower air pressure in the tire is required, than with the tire of ordinary circular form in cross section, because of the great area of pressure-receiving-surface which the chordlike form of the outer wall of the tube affords for the blocks to exert their pressure against, when under load.

By reason of the chordlike formation where the blocks adjoin the outer casing what, in effect, is a hinge connection at each end of the block extending in a straight line transversely of the tire and of considerable extent is produced, so that a block when meeting with an obstacle that forces the block inward is capable of a rocking or oscillating motion on axes that are transverse of the tire, but is restrained from any tendency to twist or turn on an axis radial to the wheel, and hence, the block is capable of having only movements that are beneficial in the cushioning action of the tire. The elastic nature of the wall of the outer casing to which the blocks are attached, is an important factor in securing satisfactory results with my invention because the material intervening between the points of attachment of the blocks 13, must be capable of elongation and contraction to render possible the described movement of the blocks to that an important characteristic of my invention is the attachment of the blocks to an element or member of the tire, within which the air is confined, that is elastic. The presence of an inelastic body, or one capable of extension and contraction, between the blocks and the volume of confined air in the tire prevents the existence of that liveliness or life which characterizes an elastic body, and hence, impairs the cushioning efficiency of the tire.

My invention, as shown in Fig. 3, is capable of an embodiment in a form enabling its application to ordinary and pneumatic tire, in which case it takes the character of a shoe and instead of the form of outer casing shown in Fig. 1 being strictly followed, it is modified, as shown in Fig. 3, to the extent of omitting the rim-engaging portion, and carrying the sides 110 of the outer casing only far enough to engage the exterior of the ordinary pneumatic tire to assure its retention thereon, and if desired it may be cemented thereto. In the embodiment of my invention, in the form illustrated in Fig. 3, ordinary pneumatic tires, even if badly worn, may be made use of.

Having thus described my invention what I claim is—

1. A pneumatic tire having an outer casing whose outer periphery is chordlike in form, and a circumferential series of blocks forming the bearing periphery of the tire spaced apart and individually attached to the chordlike wall of said outer casing, and having a correspondingly shaped surface in contact with such wall, and filling pieces in the spaces between adjacent blocks attached to said outer casing wall, said filling pieces lapping past portions of the blocks at opposite sides thereof.

2. A pneumatic tire comprising pneumatically sustained cushion having elastic side and peripheral walls, and a circumferential series of independent blocks on the exterior of said peripheral wall and individually attached thereto, said blocks being capable of movement independent of each other and having an extended bearing upon said wall transversely of the tire the peripheral wall contiguous to the blocks being flattened interiorly.

3. A pneumatic tire comprising a pneumatically sustained cushion having elastic side and peripheral walls, and a circumferential series of independent blocks on the exterior of said peripheral wall, and individually attached thereto, said blocks being capable of movement independent of each other and having an extended bearing upon said wall transversely of the tire, the peripheral wall where the blocks engage it being flattened, both interiorly and exteriorly, and the sides of the blocks toward the wall being similarly flattened, and the edges of the blocks toward the wall being straight and extending directly across the wall, whereat a transversely extending hinge-like connection exists betwen the block and the peripheral wall.

4. A pneumatic tire having an outer casing whose side and peripheral walls are of elastic material, the peripheral wall being flattened interiorly, and a circumferential series of independent blocks individually attached to said peripheral wall.

In testimony that I claim the foregoing I have hereunto set my hand.

ALFRED A. DENNIS.

Witnesses:
 HARVEY F. WONDERLY,
 CHAS. J. WILLIAMSON.

Copies of this patent may be obtained for five cents each, by addressing the "Commissioner of Patents, Washington, D. C."